(12) United States Patent
Zhuo et al.

(10) Patent No.: US 11,500,746 B2
(45) Date of Patent: Nov. 15, 2022

(54) METHOD, DEVICE AND COMPUTER PROGRAM PRODUCT FOR MANAGING DATA STORAGE

(71) Applicant: EMC IP Holding Company LLC, Hopkinton, MA (US)

(72) Inventors: Baote Zhuo, Beijing (CN); Xinlei Xu, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 358 days.

(21) Appl. No.: 16/819,715

(22) Filed: Mar. 16, 2020

(65) Prior Publication Data
US 2020/0341872 A1 Oct. 29, 2020

(30) Foreign Application Priority Data
Apr. 29, 2019 (CN) .......................... 201910354284.7

(51) Int. Cl.
*G06F 11/20* (2006.01)
*G06F 3/06* (2006.01)

(52) U.S. Cl.
CPC ........ *G06F 11/2094* (2013.01); *G06F 3/0604* (2013.01); *G06F 3/0644* (2013.01); *G06F 3/0659* (2013.01); *G06F 3/0674* (2013.01); *G06F 2201/85* (2013.01)

(58) Field of Classification Search
CPC ... G06F 11/20; G06F 11/2094; G06F 2201/85
See application file for complete search history.

(56) References Cited

U.S. PATENT DOCUMENTS

| | | | |
|---|---|---|---|
| 9,875,180 B2* | 1/2018 | Talagala | G06F 3/0608 |
| 10,628,301 B1 | 4/2020 | Ben-Yehuda et al. | |
| 10,789,170 B2 | 9/2020 | Kang et al. | |
| 10,891,057 B1 | 1/2021 | O'Brien, III et al. | |
| 2014/0136575 A1 | 5/2014 | Zhao et al. | |
| 2014/0372679 A1* | 12/2014 | Flynn | G06F 12/123 711/103 |
| 2015/0242309 A1* | 8/2015 | Talagala | G06F 3/064 711/103 |
| 2016/0117252 A1* | 4/2016 | Thangaraj | G06F 12/0873 711/118 |
| 2016/0124668 A1* | 5/2016 | Inbar | G06F 3/065 711/162 |
| 2020/0133875 A1* | 4/2020 | Jia | G06F 3/061 |
| 2022/0129174 A1* | 4/2022 | Kang | G06F 3/0689 |

* cited by examiner

*Primary Examiner* — Kamini B Patel
(74) *Attorney, Agent, or Firm* — BainwoodHuang

(57) ABSTRACT

Techniques provide for managing data storage. The techniques involve in response to receiving a request for unmapping a logical storage unit associated with a first disk slice on a first physical disk and the first disk slice, determining information associated with the first disk slice; generating, based on the information, a first entry and a second entry corresponding to the first disk slice; adding the first entry into a queue of failed disk slices to enable data stored on the first disk slice to be cleared; and adding the second entry into a queue of free disk slices to enable the first disk slice to be mapped to a further logical storage unit. Accordingly, such techniques can remarkably improve the write I/O performance of the system and prolong the lifetime of the SSD.

20 Claims, 5 Drawing Sheets

METHOD, DEVICE AND COMPUTER PROGRAM PRODUCT FOR MANAGING DATA STORAGE

CROSS REFERENCE TO RELATED APPLICATION

This application claims priority to Chinese Patent Application No. CN201910354284.7, on file at the China National Intellectual Property Administration (CNIPA), having a filing date of Apr. 29, 2019, and having "METHOD, DEVICE AND COMPUTER PROGRAM PRODUCT FOR MANAGING DATA STORAGE" as a title, the contents and teachings of which are herein incorporated by reference in their entirety.

FIELD

Embodiments of the present disclosure generally relate to data storage, and more specifically, to a method, device and computer program product for managing data storage.

BACKGROUND

Solid-State Drives (SSDs) store data in flash memory cells. The flash memory cells are grouped into pages typically of 4 to 16 KB and grouped together into blocks of typically 128 to 512 pages. For example, a flash memory cell of 512 KB has 4 KB pages in 128-page blocks. The flash memory cells can only be directly written when they are empty, otherwise they must be erased first. Due to hardware limitations, erase commands always affect entire blocks. When a written page is required to be overwritten again, the SSD needs to initiate a read-erase-modify cycle including: storing contents of an entire block in cache, erasing the entire block, writing the overwritten page to the cached block, and only then, writing the entire updated block into a flash medium. This phenomenon may be referred to as write amplification.

"Unmap" (may be referred to as TRIM in an ATA command set, and UNMAP in an SCSI command set) allows an operation system to inform the SSD which blocks of data are no longer used and can be wiped internally. After unmapping, the SSD can erase the block directly when data are written to the block again, which reduces the write amplification. The "Unmap" also increases the SSD lifetime since the amount of data movement in SSD's background garbage collection is reduced.

A mapper may initiate the unmapping process. Upon determining that data of a logical storage unit are useless, the mapper sends a request for unmapping the logical storage unit and disk slices associated with the logical storage unit, to release resources of the disk slices. In the current unmap implementations, only disk slices are released to enable these disk slices to be marked free for the subsequent usage. However, no operation is executed for backend SSDs in the process. That is to say, the data of the unmapped logical storage unit are still stored on the SSDs, although the data are failed.

SUMMARY

Embodiments of the present disclosure relate to a method, device and computer program product for data processing, so as to solve the problems in the prior art.

In a first aspect of embodiments of the present disclosure, there is provided a method of managing data storage. The method includes in response to receiving a request for unmapping a logical storage unit associated with a first disk slice on a first physical disk and the first disk slice, determining information associated with the first disk slice. The method further includes generating, based on the information, a first entry and a second entry corresponding to the first disk slice. The method also includes adding the first entry into a queue of failed disk slices to enable data stored on the first disk slice to be cleared and adding the second entry into a queue of free disk slices to enable the first disk slice to be mapped to a further logical storage unit.

In a second aspect of the present disclosure, there is provided a device for managing data storage. The device includes at least one processor; and a memory coupled to the at least one processor, the memory having instructions stored therein, the instructions, when executed by the at least one processing unit, causing the device to execute actions. The actions include in response to receiving a request for unmapping a logical storage unit associated with a first disk slice on a first physical disk and the first disk slice, determining information associated with the first disk slice; generating, based on the information, a first entry and a second entry corresponding to the first disk slice; adding the first entry into a queue of failed disk slices to enable data stored on the first disk slice to be cleared; and adding the second entry into a queue of free disk slices to enable the first disk slice to be mapped to a further logical storage unit.

In a third aspect of the present disclosure, there is provided a computer program product, which is tangibly stored on a non-transient computer readable medium and includes machine executable instructions, the machine executable instructions, when executed, causing a machine to execute the steps of the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features and advantages of example embodiments of the present disclosure will become more apparent. Several example embodiments of the present disclosure will be illustrated by way of example but not limitation in the drawings in which.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It would be appreciated that these drawings and description are only provided as example embodiments. It should be pointed out that alternative embodiments of the structure and method disclosed herein are conceivable according to the following description, and these alternative embodiments may be used without departing from principles as disclosed herein.

It is to be understood these example embodiments are discussed only for the purpose of enabling those skilled persons in the art to better understand and thus implement the present disclosure, rather than suggesting any limitations on the scope of the present disclosure.

As used herein, the term "includes", "comprises" and its variants are to be read as open-ended terms that mean "includes/comprises, but is not limited to." The term "based on" is to be read as "based at least in part on." The term "some example embodiments" is to be read as "at least some example embodiments"; and the term "another embodiment" is to be read as "at least one another embodiment". Relevant definitions of other terms may be included below.

Figure 1:
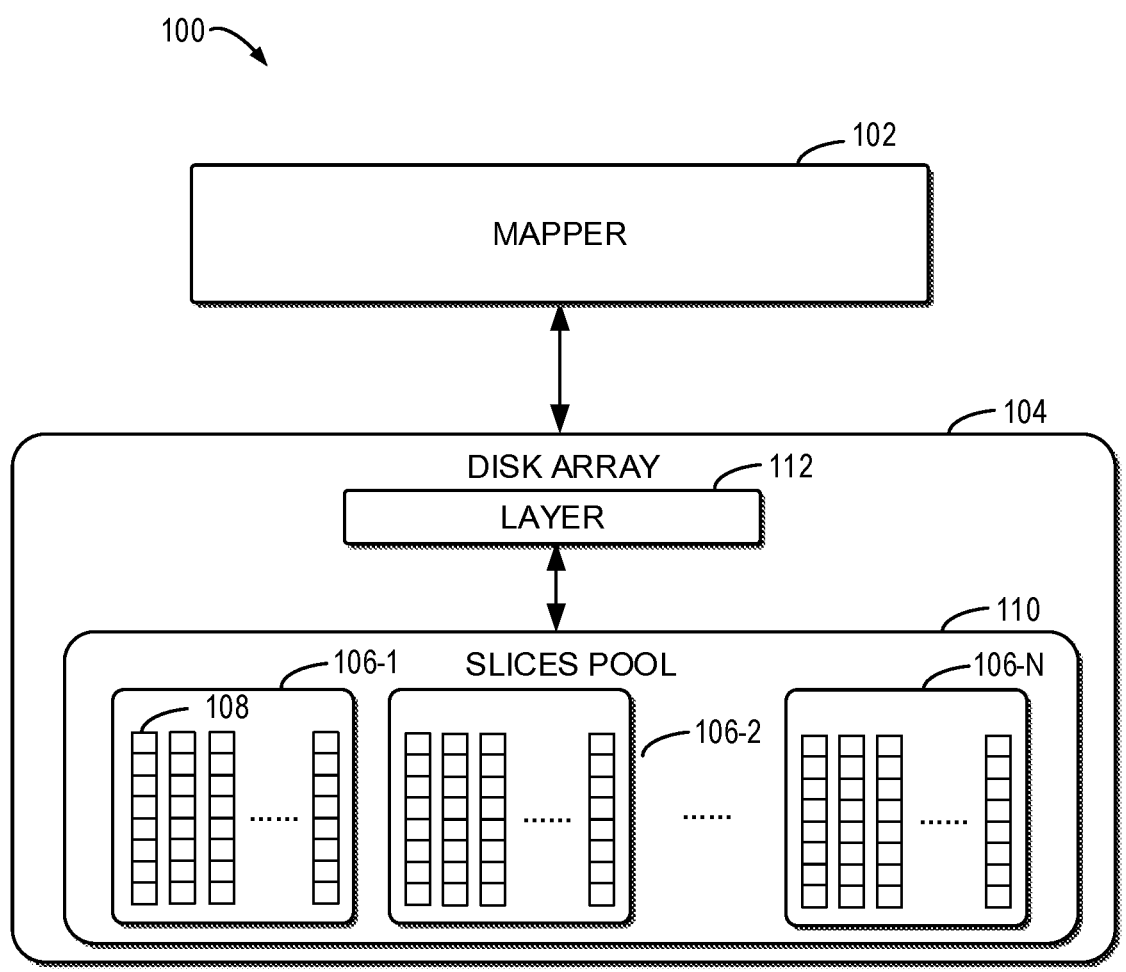
FIG. 1 is a schematic diagram illustrating an example system according to the present disclosure.

FIG. 1 is a schematic diagram illustrating an example system according to the present disclosure. As shown in FIG. 1, the system 100 includes a mapper 102. The mapper 102 may be used for mapping the addresses in the user requirement to a physical space for storing data, to facilitate data read or write for users.

The mapper 102 may provide a logical storage space with a predetermined size to an upper-level application. In some example embodiments, the size of the logical storage space may be 8 EB. The above example is provided only for illustrating the size of the available logical storage space, rather than limiting the present disclosure. The logical storage space may be of any size as requirement.

In the mapper 102, any appropriate structure may be employed to maintain mapping between a logical address and a physical address. In an example, a B+ tree is used to maintain mapping between a logical address and a physical address. The mapping includes mapping from a virtual logical block to a physical block. The virtual logical block includes one or more nodes. The above example is provided only for illustration, rather than defining the present disclosure. The mapping relation between a logical address and a physical address in the mapper 102 may be of any appropriate structure, according to needs.

In an example, the node stores therein an address of a physical block. In an example, the minimum granularity of the mapping is a 4 KB page. The above example is provided only for illustration, rather that defining the present disclosure. According to needs, any appropriate information associated with a physical block may be stored, and a mapping granularity of any size may be provided.

In an example, if the mapper 102 receives a writing request, the mapper 102 further aggregates enough 4 KB pages into a 2 MB physical large block (PLB), and then executes the writing request per physical large unit. If the mapper 102 receives a reading request, the mapper 102 may execute the reading request per physical address less than or equal to 2 MB.

The storage system 100 also includes a disk array 104. In an example, the disk array may be a redundant array of independent disks (RAID). In a further example, the disk array may be a disk array of any appropriate type. The disk array may have a predetermined width. The width of the disk array refers to a number of disks forming stripes in the disk array. In an example, RAID5 having a disk array width 4+1 indicates that the number of disks forming stripes of the RAID5 is 4+1, specifically 4 disks for storing data and a disk for storing check data.

The disk array 104 includes a slice pool 110. The slice pool 110 includes one or more disks 108. Each disk 108 is divided into one or more disk slices each having a fixed size. FIG. 1 illustrates that a disk 108 includes eight disk slices. The above examples are only used to illustrate this disclosure, not to limit it. In other embodiments, each disk may include any number of disk slices, according to needs.

The size of the disk slice may be set to any value, according to needs. In an example, the size of the disk slice is 4 GB. The above example is provided only for illustrating the present disclosure, rather than defining it. In other embodiments, disk slices of any size may be provided according to needs.

Disks in the slice pool 110 are all aggregated into one or more RAID resilience sets (RRSs) 106-1, 106-2, . . . , 106-N (which may be collectively referred to as RAID resilience set 106 herein), where N is a positive integer greater than 1.

The slices in the RAID resilience set 106 may be used to form one or more logical storage units. In an example, slices in a logical storage unit all come from a RAID resilience set. A logical storage unit is equivalent to a traditional RAID. In an example, the mapper 102 stores therein a mapping relation between a logical storage unit and a physical large block. The above example is provided only for illustrating the present disclosure, rather than defining the same.

The disk array 104 further includes one or more layers. For the purpose of illustration only, FIG. 1 shows that the disk array includes a layer 112. The above example is provided only for illustrating the present disclosure, rather than defining the same. Any appropriate number of layers may be set according to needs.

The layer 112 may be read and/or invoked by the mapper 102. The layer 112 includes one or more logical storage units. The logical storage unit may be considered as a set of RAID stripes associated with a plurality of disk slices. Alternatively or in addition, the logical storage units in the layer 112 have the same disk array format. In an example, different layers may have different disk array formats. In another example, different layers may have the same disk array format.

In some example, the logical storage unit in the layer 112 may be of an appropriate disk array type and/or disk array width. For example, the logical storage unit may be RAID5 having a disk array width 4+1, RAID5 having a disk array width 8+1, or RAID 5 having a disk array width 16+1. The above example is provided only for illustration, without limiting the present disclosure. The logical storage unit in the layer may be of any appropriate disk array type and disk array width, according to needs.

As discussed above, the mapper 102 may initiate the unmapping process. Upon determining that the data of the logical storage unit are useless, the mapper 105 sends a request for unmapping the logical storage unit and the disk slices associated with the logical storage unit, to release resources of the disk slices. In the current unmapping implementations, only disk slices are released to enable these disk slices to be marked as free for subsequent usage. However, in the process, no operation is executed for the physical disks (for example, the disk 108) where these disk slices are located. In other words, the data of the unmapped logical storage unit are still stored on the physical disks, although the data are invalid.

If the free disk slices are allocated again, when a write I/O touches the areas of these disk slices on the respective physical disks, the physical disks need to initiate a read-erase-modify cycle. In the cycle, all contents of a block comprised of a plurality of pages are stored in cache, and then, the entire block is erased. Thereafter, the overwritten page is written into the cached block, and only then can the entire updated block be written to the flash medium. This phenomenon is known as write application, which leads to a decline in write I/O performance.

Hence, the present disclosure provides a method of managing data storage, which can improve significantly the write I/O performance of the system on one hand, and can prolong the lifetime of the physical disks on the other hand.

Figure 2:
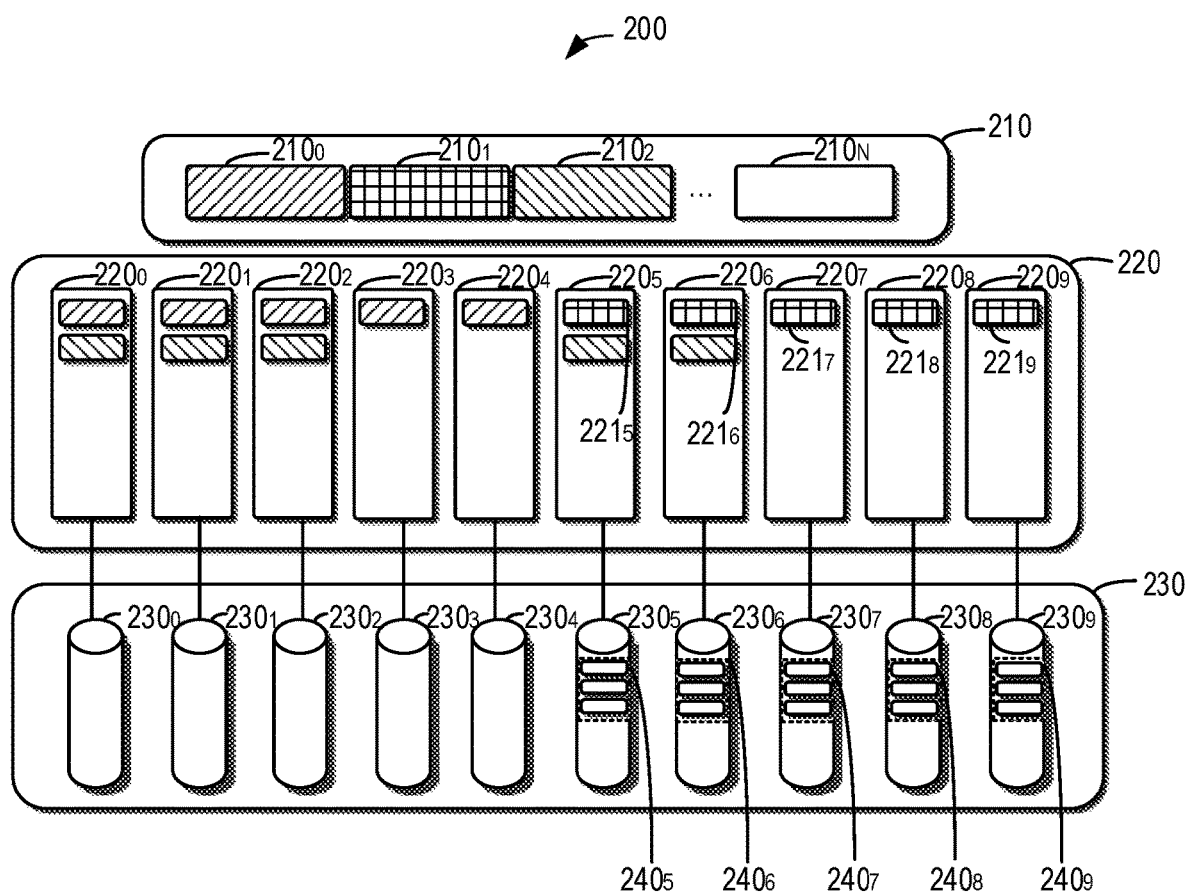
FIG. 2 is a schematic diagram illustrating an example scenario in which embodiments of the present disclosure can be implemented.

FIG. 2 is a diagram illustrating an example scenario in which embodiments of the present disclosure will be implemented. In the scenario of FIG. 2, a mapper storage space 210 is shown. The mapper storage space 210 is associated with a plurality of logical storage units $210_0$, $210_1$, $210_2$ . . . $210_N$. The plurality of logical storage units $210_0$, $210_1$, $210_2$ . . . $210_N$ have a mapping relation with a plurality of disk slices in physical disks, respectively. In other words, these disk slices may be regarded as stripes for forming a logical storage unit.

For example, FIG. 2 shows a virtual disk pool 220 corresponding to a physical disk pool 230. Disk slices in each virtual disk ($220_0$, $220_1$ . . . $220_9$) in the virtual disk pool 220 correspond to a storage space in a respective physical disk ($230_0$, $230_1$ . . . $230_9$) in the physical disk pool 230. For example, the logical storage unit $210_1$ may have a mapping relation with disk slices in the physical disks $230_5$, $230_6$ . . . $230_9$. The mapping relation may be represented in the virtual disk pool 220 as a mapping relation with disk slices $221_5$, $221_6$ . . . $221_9$ in the virtual disks $220_5$, $220_6$ . . . $220_9$. These disk slices $221_5$, $221_6$ . . . $221_9$ correspond to the respective storage spaces $240_5$, $240_6$ . . . $240_9$ in the physical disks $230_5$, $230_6$ . . . $230_9$, respectively.

Once the logical storage unit receives an unmap request from the mapper, the mapping relation between the logical storage unit and disk slices associated with the logical storage unit is released. The logical storage unit $210_1$ is taken as an example. Once the unmap request from the mapper, the mapping relation between the logical storage unit $210_1$ and the disk slices $221_5$, $221_6$ . . . $221_9$ is released.

Figure 3:
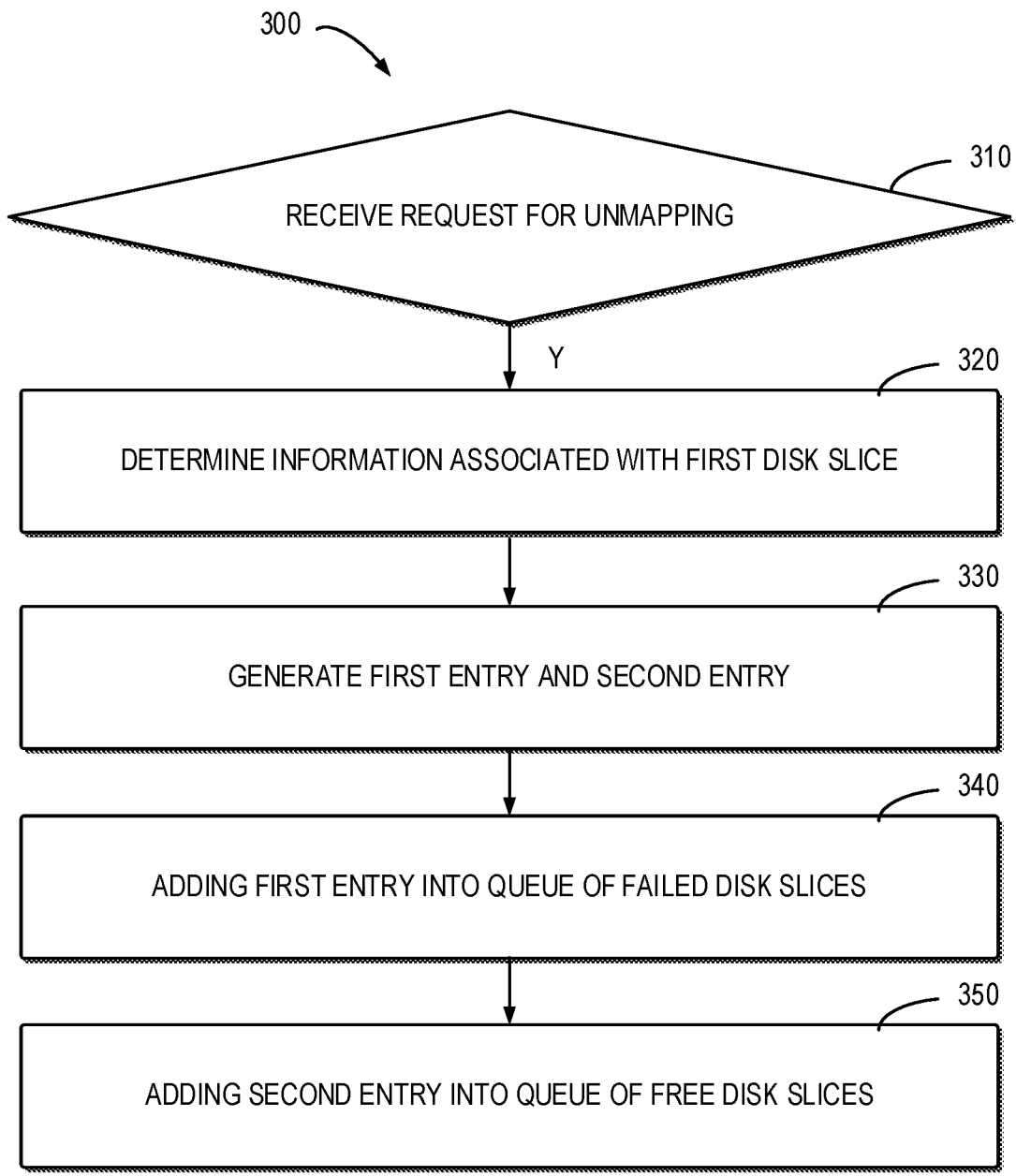
FIG. 3 is a flowchart illustrating a method 300 according to embodiments of the present disclosure.

The method according to embodiments of the present disclosure will be described below in detail with reference to FIGS. 3-5. FIG. 3 is a flowchart illustrating a method 300 according to embodiments of the present disclosure. The method as shown in FIG. 3 is adaptable to the scenario as described in FIG. 2. For ease of description, the reference symbols employed in FIG. 3 are consistent with those in FIG. 2 for the same or similar components.

If a request for unmapping the logical storage unit $210_1$ associated with the disk slice $221_5$ on the physical disk $230_5$ and the disk slice $221_5$ is received at block 310, information associated with the disk slice $221_5$ is determined at block 320.

In some embodiments, determining the information may include determining at least one of an identifier of the physical disk $230_5$, an index of the disk slice $221_5$ in the physical disk $230_5$ and a capacity of the disk slice $221_5$.

At block 330, a first entry and a second entry are generated based on the determined information.

In some embodiments, the first entry may be generated based on the identifier of the physical disk $230_5$, the index of the disk slice $221_5$ in the physical disk $230_5$ and the capacity of the disk slice $221_5$.

In some embodiments, the second entry may be generated based on the index of the disk slice $221_5$ in the physical disk $230_5$. Optionally, the second entry may be generated based on the identifier of the physical disk $230_5$, and the index of the disk slice $221_5$ in the physical disk $230_5$.

At block 340, the first entry is added into a queue of failed disk slices to enable the data stored on the disk slice $221_5$ to be cleared. At block 350, the second entry is added to a queue of free disk slices to enable the disk slice $221_5$ to be mapped to a further logical storage unit.

Figure 4:
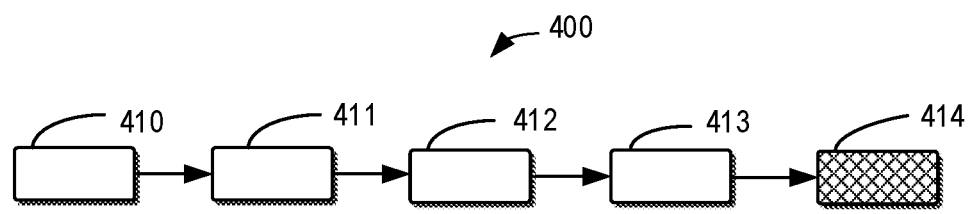
FIG. 4 is a schematic diagram illustrating a queue of failed disk slices according to embodiments of the present disclosure.
Figure 5:
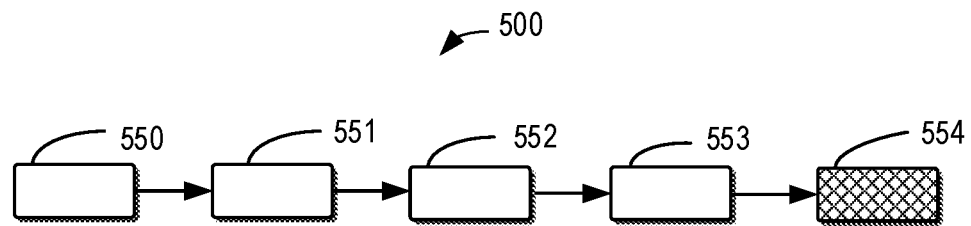
FIG. 5 is a schematic diagram of a queue of free disk slices according to embodiments of the present disclosure.

FIG. 4 is a schematic diagram illustrating a queue of failed disk slices according to embodiments of the present disclosure. FIG. 5 is a schematic diagram illustrating a queue of free disk slices according to embodiments of the present disclosure.

As shown in FIG. 4, the first entry 414 is added into the queue of failed disk slices 400. The queue of failed disk slices 400 may be considered as a First-in First-out (FIFO) queue. Once the first entry 414 is added into the queue of failed disk slices 400, which indicates that the data on the disk slice $221_5$ are to be cleared. As described above, the first entry 414 may be generated based on the identifier of the physical disk $230_5$, the index of the disk slice $221_5$ in the physical disk $230_5$, and the capacity of the disk slice $221_5$. In addition, the first entry 414 may further include process information (checkpoint) of clearing the data, and an initial value of the process information is set to 0.

In some embodiments, if a determination that a number of entries in the failed disk queue 400 exceeds a threshold number, an entry to be removed is selected from the number of entries. Optionally, the number of entries may be all removed. As shown in FIG. 4, if the entry to be removed is 412, it corresponds to, for example, the disk slice $221_6$ in the disk $230_6$, and the data in the disk slice $221_6$ thus are cleared from the disk $230_6$. If the data in the disk slice $221_6$ are cleared from the disk $230_6$, the entry 412 is removed from the queue of failed disk slices 400.

In some embodiments, if the physical disk receives a command to clear the data, a predetermined amount of failed data can be obtained from the command. For example, the command may be written as [disk slice offset+checkpoint, disk slice offset+checkpoint+32 MB]. The disk slice offset is a product of the capacity of the disk slice and the index of the disk slice. The command indicates the data amount cleared each time, i.e., the predetermined amount of failed data is 32 MB.

In some embodiments, the process information of clearing the data in the entry 412 may be updated based on the predetermined amount of failed data, and if the process information indicates that the amount of cleared data is equal to the capacity of disk slice $221_6$, it is determined that data have been cleared.

In addition to the queue of failed disk slices 400, there is a queue of free disk slices for each physical disk. Optionally, there may be a general queue of free disk slices for all physical disks. As shown in FIG. 5, for example, for the physical disk $230_5$, there is a queue of free disk slices 500. Once the entry 554 is added into the queue of free disk slices 500, it indicates that the respective disk slice (for example, the disk slice $221_5$) can be associated with a further logical storage unit.

In some embodiments, if the disk slice $221_5$ establishes an association with a further logical storage unit, an entry 554 may be removed from the queue of free disk slices 500. Once the entry 554 is removed from the queue of free disk slices 500, the entry 414 associated with the disk slice $221_5$, even having not been removed from the queue of failed disk slices 400 (i.e., the data clearing process in the respective disk having not been completed), will be removed from the queue of failed disk slices 400.

In this way, the method can remarkably reduce the write amplification count, thereby improving the write I/O performance of the system and prolonging the lifetime of the SSD.

Figure 6:
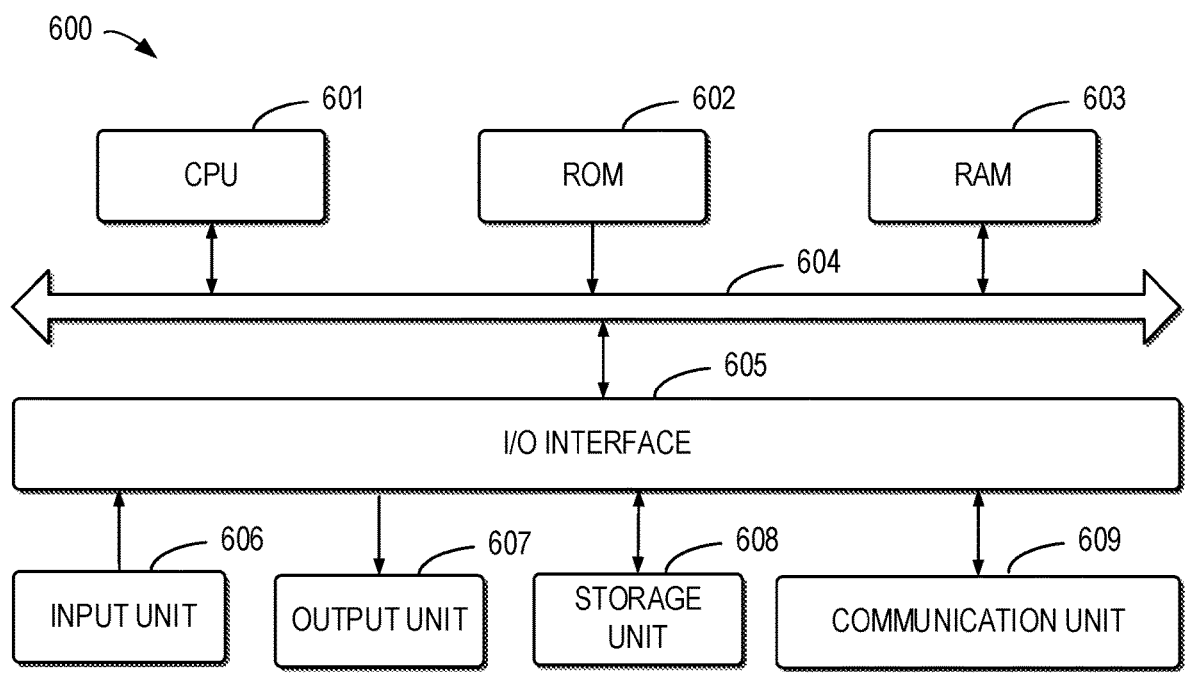
FIG. 6 is a schematic diagram illustrating a device 600 that can be used to implement embodiments of the present disclosure.

FIG. 6 is a schematic block diagram illustrating an example device 600 that can be used to implement embodiments of the present disclosure. For example, any one of 102, 104, 110 and 112 as shown in FIG. 1 can be implemented by the device 600. As shown, the device 600 includes a central processing unit (CPU) 601 that may perform various appropriate acts and processing based on computer program instructions stored in a read-only memory (ROM) 602 or computer program instructions loaded from a storage unit 604 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input unit 606, such as a keyboard, a mouse and the like; an output unit 607, such as various kinds of displays and a loudspeaker, etc.; a storage unit 608, such as a magnetic disk, an optical disk, and etc.; a communication unit 609, such as a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the methods 300 and 400, can be executed by the processing unit 601. For example, in some embodiments, the methods 300 and 400 can be implemented as a computer software program that is tangibly embodied on a machine readable medium, e.g., the storage unit 604. In some embodiments, part or all of the computer programs can be loaded and/or mounted onto the device 600 via ROM 602 and/or communication unit 609. When the computer program is loaded to the RAM 603 and executed by the CPU 601, one or more steps of the methods 300 and 400 as described above may be executed.

The present disclosure is directed to a method, a device, a system and/or a computer program product. The computer program product may include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (system), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams can represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments of the present disclosure. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing data storage, comprising:
   in response to receiving a request for unmapping a logical storage unit associated with a first disk slice on a first physical disk and the first disk slice, determining information associated with the first disk slice;
   generating, based on the information, a first entry and a second entry corresponding to the first disk slice;
   adding the first entry into a queue of failed disk slices to enable data stored on the first disk slice to be cleared; and
   adding the second entry into a queue of free disk slices to enable the first disk slice to be mapped to a further logical storage unit,
   in response to the number of entries in the queue of failed disk slices exceeding a threshold number, selecting a third entry to be removed from the number of entries, the third entry corresponding to a second disk slice on a second physical disk;
   clearing data in the second disk slice from the second physical disk; and
   in response to the data in the second disk slice being cleared, removing the third entry from the queue of failed disk slices.

2. The method of claim 1, wherein clearing the data comprises:
   in response to receiving a command to clear the data, obtaining a predetermined amount of failed data from the command;
   updating, based on the predetermined amount of failed data, progress information of clearing the data in the third entry; and
   in response to the progress information indicating that an amount of cleared data is equal to a capacity of the second disk slice, determining that the data has been cleared.

3. The method of claim 1, further comprising:
   in response to the first disk slice in the queue of free disk slices being mapped to the further logical storage unit, removing the second entry from the queue of free disk slices.

4. The method of claim 1, wherein determining the information comprises determining
   at least one of the following:
      an identifier of the first physical disk,
      an index of the first disk slice in the first physical disk, and
      a capacity of the first disk slice.

5. The method of claim 4, wherein the information comprises the identifier of the first physical disk, the index of the first disk slice in the first physical disk and the capacity of the first disk slice, and wherein generating the first entry comprises:
   generating the first entry, based on the identifier of the first physical disk, the index of the first disk slice in the first physical disk and the capacity of the first disk slice.

6. The method of claim 4, wherein the queue of free disk slices is associated with the first physical disk, the information comprising the index of the first disk slice in the first physical disk, and wherein generating the second entry comprises:
generating the second entry at least based on the index.

7. The method of claim 4, wherein the queue of free disk slices is associated with a plurality of physical disks including the first physical disk, the information comprising the index of the first disk slice in the first physical disk and the identifier of the first physical disk, and wherein generating the second entry comprises:
generating the second entry based on the index and the identifier.

8. A device for managing data storage, comprising:
at least one processor; and
a memory coupled to the at least one processor, the memory having instructions stored therein, the instructions, when executed by the at least one processing unit, causing the device to execute acts, the acts comprising:
in response to receiving a request for unmapping a logical storage unit associated with a first disk slice on a first physical disk and the first disk slice, determining information associated with the first disk slice;
generating, based on the information, a first entry and a second entry corresponding to the first disk slice;
adding the first entry into a queue of failed disk slices to enable data stored on the first disk slice to be cleared;
adding the second entry into a queue of free disk slices to enable the first disk slice to be mapped to a further logical storage unit;
in response to the number of entries in the queue of failed disk slices exceeding a threshold number, selecting a third entry to be removed from the number of entries, the third entry corresponding to a second disk slice on a second physical disk;
clearing data in the second disk slice from the second physical disk; and
in response to the data in the second disk slice being cleared, removing the third entry from the queue of failed disk slices.

9. The device of claim 8, wherein clearing the data comprises:
in response to receiving a command to clear the data, obtaining a predetermined amount of failed data from the command;
updating, based on the predetermined amount of failed data, process information of clearing the data in the third entry; and
in response to the process information indicating that an amount of cleared data is equal to a capacity of the second disk slice, determining that the data has been cleared.

10. The device of claim 8, the acts further comprising:
in response to the first disk slice in the queue of free disk slices being mapped to the further logical storage unit, removing the second entry from the queue of free disk slices.

11. The device of claim 8, wherein determining the information comprises determining at least one of the following:
an identifier of the first physical disk,
an index of the first disk slice in the first physical disk, and
a capacity of the first disk slice.

12. The device of claim 11, wherein the information comprises the identifier of the first physical disk, the index of the first disk slice in the first physical disk and the capacity of the first disk slice, and wherein generating the first entry comprises:
generating the first entry, based on the identifier of the first physical disk, the index of the first disk slice in the first physical disk and the capacity of the first disk slice.

13. The device of claim 11, wherein the queue of free disk slices is associated with the first physical disk, the information comprising the index of the first disk slice in the first physical disk, and wherein generating the second entry comprises:
generating the second entry at least based on the index.

14. The device of claim 11, wherein the queue of free disk slices is associated with a plurality of physical disks including the first physical disk, the information comprising the index of the first disk slice in the first physical disk and the identifier of the first physical disk, and wherein generating the second entry comprises:
generating the second entry, based on the index and the identifier.

15. A computer program product having a non-transitory computer readable medium which stores a set of instructions to manage data storage; the set of instructions, when carried out by computerized circuitry, causing the computerized circuitry to perform a method of:
in response to receiving a request for unmapping a logical storage unit associated with a first disk slice on a first physical disk and the first disk slice, determining information associated with the first disk slice;
generating, based on the information, a first entry and a second entry corresponding to the first disk slice;
adding the first entry into a queue of failed disk slices to enable data stored on the first disk slice to be cleared;
adding the second entry into a queue of free disk slices to enable the first disk slice to be mapped to a further logical storage unit;
in response to the number of entries in the queue of failed disk slices exceeding a threshold number, selecting a third entry to be removed from the number of entries, the third entry corresponding to a second disk slice on a second physical disk;
clearing data in the second disk slice from the second physical disk; and
in response to the data in the second disk slice being cleared, removing the third entry from the queue of failed disk slices.

16. The computer program product of claim 15, wherein clearing the data comprises:
in response to receiving a command to clear the data, obtaining a predetermined amount of failed data from the command;
updating, based on the predetermined amount of failed data, progress information of clearing the data in the third entry; and
in response to the progress information indicating that an amount of cleared data is equal to a capacity of the second disk slice, determining that the data has been cleared.

17. The computer program product of claim 15, wherein the method further comprises:
in response to the first disk slice in the queue of free disk slices being mapped to the further logical storage unit, removing the second entry from the queue of free disk slices.

18. The computer program product of claim 15, wherein determining the information comprises determining
at least one of the following:
an identifier of the first physical disk,
an index of the first disk slice in the first physical disk, and
a capacity of the first disk slice.

19. The computer program product of claim 18, wherein the information comprises the identifier of the first physical disk, the index of the first disk slice in the first physical disk and the capacity of the first disk slice, and wherein generating the first entry comprises:
generating the first entry, based on the identifier of the first physical disk, the index of the first disk slice in the first physical disk and the capacity of the first disk slice.

20. The computer program product of claim 18, wherein the queue of free disk slices is associated with the first physical disk, the information comprising the index of the first disk slice in the first physical disk, and wherein generating the second entry comprises:
generating the second entry at least based on the index.

\* \* \* \* \*

UNITED STATES PATENT AND TRADEMARK OFFICE
CERTIFICATE OF CORRECTION

PATENT NO. : 11,500,746 B2
APPLICATION NO. : 16/819715
DATED : November 15, 2022
INVENTOR(S) : Baote Zhuo, Xinlei Xu and Yousheng Liu Page 1 of 1

It is certified that error appears in the above-identified patent and that said Letters Patent is hereby corrected as shown below:

In the Claims

In Claim 1, Column 10, Line 22, "and," should be deleted.

In Claim 1, Column 10, Line 25, "logical storage unit," should read -- logical storage unit; --.

Signed and Sealed this
Third Day of January, 2023

Katherine Kelly Vidal
*Director of the United States Patent and Trademark Office*